W. L. BELL.
BOLT.
APPLICATION FILED JAN. 28, 1920.
1,390,485.
Patented Sept. 13, 1921.
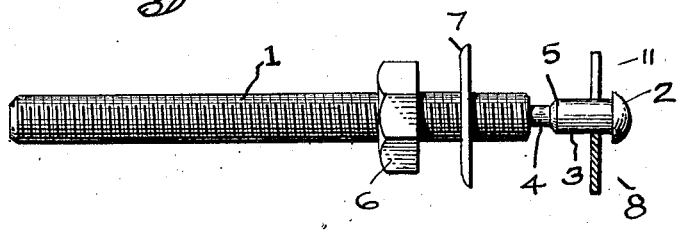
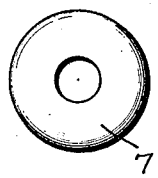 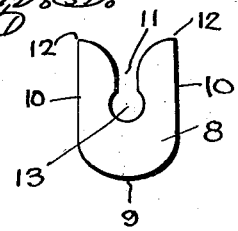
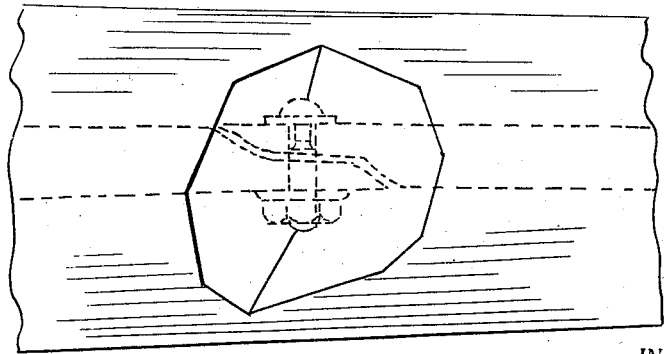
WITNESS
INVENTOR
William L. Bell
BY
ATTORNEY

UNITED STATES PATENT OFFICE.

WILLIAM L. BELL, OF OAKLAND, CALIFORNIA.

BOLT.

1,390,485. Specification of Letters Patent. Patented Sept. 13, 1921.

Application filed January 28, 1920. Serial No. 354,661.

*To all whom it may concern:*

Be it known that I, WILLIAM L. BELL, a citizen of the United States, and a resident of the city of Oakland, county of Alameda, and State of California, have made a new and useful invention, to wit, Improvements in Bolts; and I do hereby declare the following to be a full, clear, concise, and exact description of the same.

This invention relates particularly to bolts for surgical purposes for the fixation of bone fractures and the like.

Among the objects of the invention are to produce a bolt for the purpose, that may be readily applied or removed and that requires the smallest possible incision or displacement of the surrounding tissues in applying the bolt. A further object is to provide a supplemental head of such shape and mode of application that it may be readily applied to the head of the bolt in an awkward position by the sense of feeling of the operator without visual aid. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description it is desired to cover the invention in whatsoever form it may be embodied.

In the accompanying one sheet of drawings.

Figure 1 is a greatly enlarged side elevation of a bolt constructed in accordance with this invention.

Fig. 2 is a plan view of a washer for use upon the same.

Fig. 3 is a similar view of the supplemental removable head.

Fig. 4 is a diagrammatic view showing the manner of applying my invention to the broken ends of a bone.

In detail the construction illustrated in the drawings includes the body of the bolt 1, having a running thread thereon of indeterminate length. The head 2 of the bolt is of the same diameter as the body. The shank 3 is of slightly reduced diameter and intervenes between the body 1 and the shank 3 with a tapered shoulder 5 to form the neck 4 adjacent the shank 3. The bolt is preferably formed of an integral rod having the neck, shank and head turned or swaged thereupon. The shank 3 is preferably of a diameter equal to the diameter of the body 1 taken from the bottom of the thread cut thereon. The nut 6 is threaded to run freely upon the body 1 and to bear against the washer 7.

The supplemental head 8 consists of a flat plate preferably of the outline shown in Fig. 3, having the rounded end 9 and the parallel sides 10—10. The throat 11 is of the proper width to just pass the diameter of the neck 4 freely. This throat flares outwardly to the points 12—12 in free curves. This throat leads into the center hole 13 that is of a diameter to freely fit the shank 3 upon which the supplemental head slides into abutment with the underside of the head 2 of the bolt, in which position the hole 13 engages the shank 3 and prevents the lateral displacement of the supplemental head when in the operative position.

For surgical purposes it is desirable to make the bolt and the assembled parts of nickel steel or other alloy of proper strength and having a high resistance to corrosion or rust. The various parts may be plated to resist corrosion, but it is not always advisable to introduce two metals into a bolt that may under acid conditions set up electrolysis that might weaken the structure of the bolt or set up bad pathological conditions. For surgical purposes such bolts are usually from $\frac{1}{8}$ to $\frac{3}{16}$ of an inch in diameter and of various lengths. The structures shown in the drawings are greatly enlarged better to accentuate the relative proportions of the various parts.

The technique of applying the surgical bolt is substantially as follows: A proper incision is made through the flesh, then by the use of forceps and clamps and other proper instruments the obliquely broken ends of the bone are brought to perfect alinement restoring the bone to its length before the fracture occurred. A hole is then drilled through both ends of the bone while they are in registry. This hole is preferably placed, not directly transverse to the axis of the bone, but inclined slightly toward the angle of fracture. The purpose of this slanting of the hole in the general direction of the line of fracture is to form a hooklike condition between the ends of the bone and the bolt. This angularity of the bolt also tends better to draw the ends of the bone into juxtaposition when tension is applied by the nut. When the drill is removed from the hole the head 2 of the bolt is inserted through the length of the hole until the end protrudes on the other side of the bone. A pair of bent forceps are used to grasp the end 9 of the supplemental head 8, which is then inserted in the incision and beneath the bone until the throat 11 engages the neck 4 and the hole 13 engages the shank 3 and slides thereon into contact with the head 2. The washer 7 is then placed over the bolt on the outer side of the bone, and the nut 6 threaded onto the body 1 into contact with the washer 7, until the necessary amount of draft is applied to the bone to prevent the dislodgment of the supplemental head 8 from the shank, without applying any appreciable tension between the head 2 and the nut 6, likely to set up irritation such as might interfere with the proper knitting of the fracture. After the operation of placing the bolt the protruding end of the bolt above the nut 6 is nipped off with a suitable cutter that will sever the bolt with a clean cut without leaving any sharp ends likely to cause irritation when the wound is closed.

A bolt constructed in accordance with this invention can be applied in the minimum of time and the nut screwed into place in the most convenient position for the operator. During the operation of screwing on the nut it would swivel on the washer 7 without rotating in a manner to displace or bruise the periosteum of the bone.

The usual practice heretofore has been to apply the bolt with the head above which has necessitated placing the nut on the underside of the bone, out of view of the operator and in a very difficult position to be screwed on to the bolt, also necessitating the selection of bolts of approximately the right length, then nipping off the protruding end of the bolt within the wound, which leaves the end out of sight of the operator, and leaving the exposed end of the bolt often cut off at an acute angle that leaves an irritating point, which endangers the proper healing of the surrounding tissues, all of which disadvantages are obviously eliminated by the present construction.

Having thus described this invention, what I claim to secure by Letters Patent is:—

1. A bolt having a threaded portion; a nut on said portion; a reduced shank forming a head; a reduced neck, and a supplemental head slotted to pass said neck and engage said shank contiguous to said head.

2. A bolt having a threaded portion; a reduced shank forming a head; a reduced neck; a tapered shoulder between said shank and neck; and a supplemental head slotted to pass said neck and engage said shank.

3. A bolt having a reduced shank forming a head; a reduced neck; a tapered shoulder between said shank and neck; and a supplemental head slotted with a converging entrance to pass said neck and engage said shank.

In testimony whereof, I have hereunto set my hand at San Francisco, California, this 21st day of January 1920.

WILLIAM L. BELL.

In presence of—
LINCOLN JOHNSON.